Patented Dec. 8, 1925.

1,564,267

UNITED STATES PATENT OFFICE.

WILLIAM OWEN, OF PITTSBURGH, PENNSYLVANIA, ASSIGNOR TO PITTSBURGH PLATE GLASS COMPANY, A CORPORATION OF PENNSYLVANIA.

APPARATUS FOR HANDLING GLASS SHEETS.

Application filed February 16, 1924. Serial No. 693,249.

*To all whom it may concern:*

Be it known that I, WILLIAM OWEN, a citizen of the United States, and a resident of Pittsburgh, in the county of Allegheny and State of Pennsylvania, have made a new and useful invention in Improvements in an Apparatus for Handling Glass Sheets, of which the following is a specification.

Figure 1:
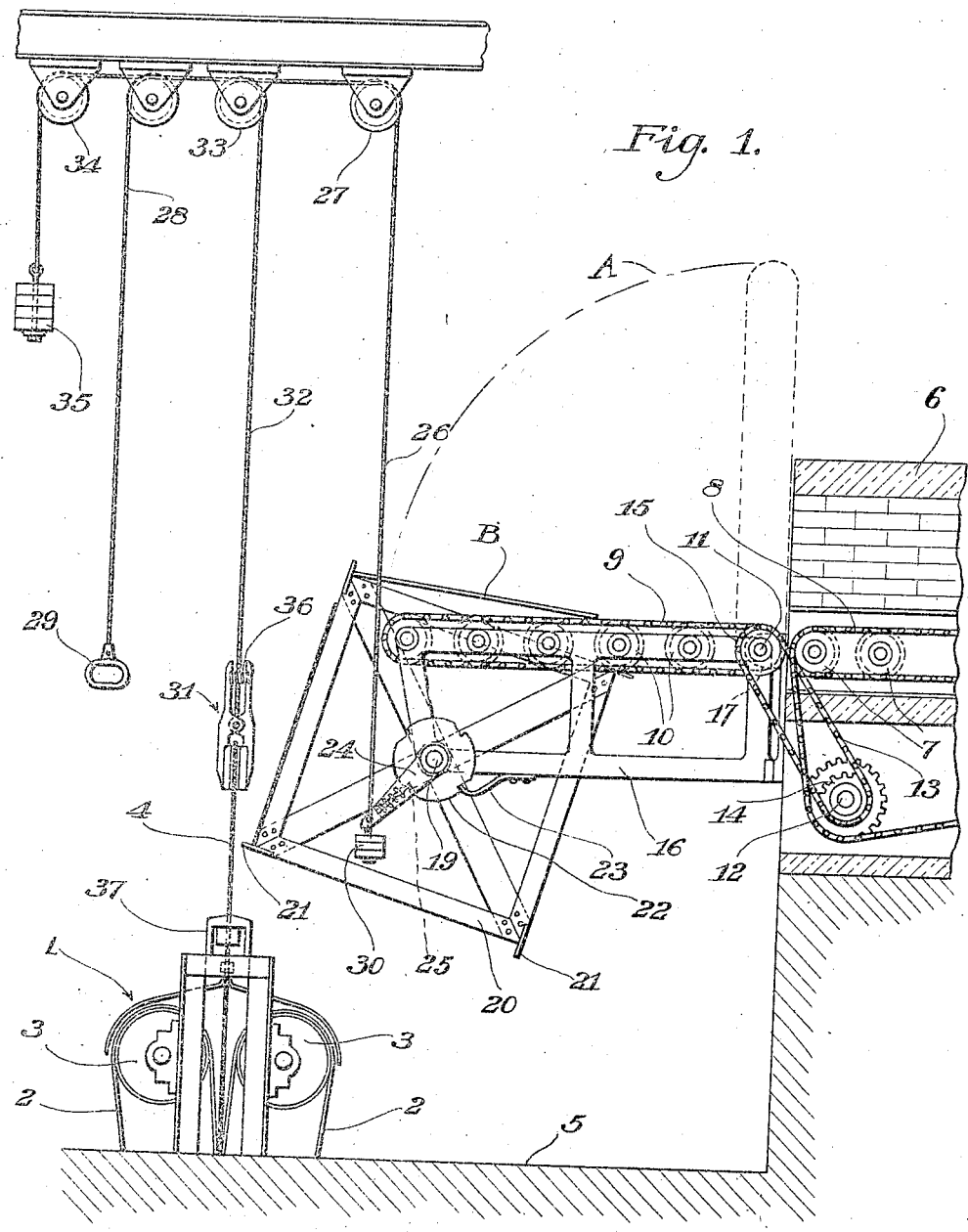
Figure 2:
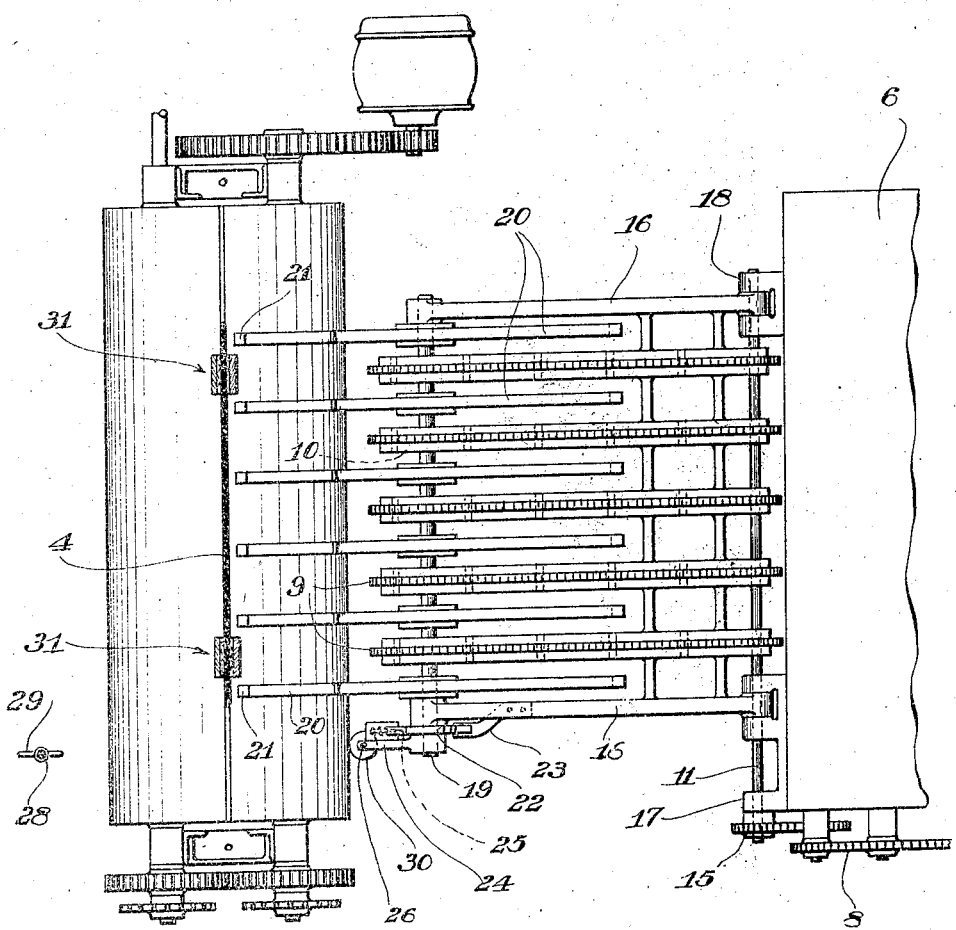

The invention relates to apparatus for handling glass sheets as produced in a continuous vertical drawing operation such as that shown and described in the application of H. G. Slingluff, Serial Number 621,184, wherein the glass is drawn between a pair of asbestos belts, at the upper ends of which the glass emerges and is cut into lengths. The present invention has for its objects, the provision of improved means for supporting the glass sheets after they are cut off and placing them upon a horizontal carrier device, thus relieving the operator or operators of a considerable part of the hand labor otherwise required. As illustrated, the horizontal carrier to which the sheets are transferred leads to a leer for annealing, or flattening, or both, but in some cases, the leer may not be required and the carrier may lead to a point where the sheets are removed and stacked for storage or further transfer, or to the cutting room. One embodiment of the invention is illustrated in the accompanying drawings wherein:

Figure 1 is a side elevation of the apparatus. And Fig. 2 is a plan view thereof.

Referring to the drawings, 1 is the upper end of the drawing machine heretofore referred to as shown and described in the Slingluff application, such drawing machine including a pair of asbestos belts 2, 2 passing around the pulleys 3, 3 between which the continuous glass sheet 4 is drawn, but it will be understood that the invention is not limited to use with any particular form of vertical glass drawing machine. The body of the drawing machine is below the floor 5 and is not shown. At one side of the drawing machine is a roller leer 6 provided with a series of rolls 7 driven from the chain 8. The glass sheets are preferably passed through this leer in order to insure their more perfect annealing, and to flatten such of them as require it. Leading into the leer is a continuous ribbon carrier in the form of a plurality of endless chains 9 supported upon the sprocket wheels 10 carried by the shafts 11, the end one of which is driven from the shaft 12 through the intermediary of the chain 13 and the sprockets 14 and 15 keyed to the two shafts. The shafts 11 upon which the sprockets carrying the chains are mounted are supported in a rigid framework 16 and this frame is preferably mounted for swinging movement about the shaft 11 nearest the leer so that the frame and parts carried thereby may be swung vertically on the line A when it is desired to secure working space intermediate the end of the leer and the drawing machine. The end shaft 11 about which the frame pivots is mounted in suitable brackets 17 and 18 (Fig. 2) rigidly secured to the leer framework.

Also extending transversely of the frame 16 and pivotally supported therein is a shaft 19 which carries the spaced sections 20, 20, 20, etc. making up the transfer drum. These sections 20, 20, 20, etc. are interspersed between the chains 9, 9, 9, etc. making up the carrier, so that the drum is free to rotate through the carrier in order to perform the function of transferring the sheets of glass from the drum to the carrier as hereinafter described. At one edge of each of the faces making up the drum are the projecting fingers 21, 21, etc. which provide supporting ledges for the glass sheets after they are transferred from the supporting clamp to the drum. The drum is provided at one end with a rigid plate 22 secured to the shaft 19, which plate also acts as an indexing device, the indexing being accomplished by means of the spring 23 which yieldingly maintains the drum in the position indicated in Fig. 1. An arm 24 is mounted loosely on the shaft 19 and provided with a spring pressed pawl 25 for engaging the notches in the rigid plate 22. This arm is operated from the rope 26 extending over the pulleys 27 and 28 and provided with the handle 29 within convenient reach of the operator. The arm 24 is counterweighted by means of the weights 30 so that after the arm has been moved upward to rotate the drum one step, the counterweight will return it to the position illustrated.

The upper edge of the glass sheet 4 is engaged by the clamps 31 counterweighted by means of the cables 32 extending over the pulleys 33 and 34 and provided with the weights 35. The clamps are normally held closed by means of springs 36, although any other type of clamp might be employed, such as one employing magnets or similar devices for clamping the jaws. The gripping force imposed upon the edge of the sheet by the clamps is such that it will be supported after it is cut off. The sheet may be cut off, after it has attained a suitable length, by any means known in the art, but preferably this is accomplished by the device shown in the Slingluff Patent No. 1,373,533, which employs a pair of electrically heated bands on opposite sides of the sheet, this device being indicated at 37, and being particularly suitable for use in cutting off glass which is hot or imperfectly annealed and, therefore, difficult to cut with a wheel or a diamond.

The operation is as follows: As the sheet emerges above the drawing machine, its upper edge is gripped by the clamps which ride upward with the sheet until the sheet attains the desired length, when it is cut off at a point below the level of the projecting fingers 21 of the transfer drum. The operator then swings the lower edge of the sheet to the right so that it rests upon the fingers, after which he releases the clamp and allows the sheet to rest against the face of the drum. He then grasps the handle 29 and operates it to rotate the drum through an arc of 90 degrees, thus bringing the next face of the drum in position to receive the next sheet cut off, while the sheet already cut off arrives at the position marked B with its lower edge in engagement with the chains 9 of the carrier. The movement of these chains to the right carries the glass into the leer so that by the time another sheet is placed upon the drum and such drum is rotated, the first sheet is out of the way. The transfer device is easily operated, since it requires no attention after the operator pulls down the handle 29 to rotate the drum. The labor incident to placing the sheets upon the drum is also relatively slight, since all that is necessary is to swing the lower edge of the sheet laterally until it rests upon one of the sets of fingers 21. The transfer drum is also preferable to a frame with a single face oscillating back and forth in that the single operation of rotating the drum 90 degrees not only takes care of the sheet which has been placed upon the drum, but also brings the drum to position to receive another sheet. With an oscillating transfer frame, it would be necessary to employ two movements, one to bring the sheet onto the carrier, and the other to bring it back from such position to its original position. The drum with a plurality of faces which is rotated in one direction is, therefore, more convenient than a frame similarly arranged, but having only a single face. The indexing device insures that the drum will always be in the same position when at rest with one of its faces in inclined position so as to receive the sheet which is cut off to the best advantage. The transfer drum, being carried by the frame 16, which swings upward as heretofore explained is also gotten out of the way by this swinging movement, giving free access to this side of the drawing machine, which is a considerable advantage under certain conditions, particularly when the glass sheet being drawn is fractured below the cutting off point and it is necessary to remove broken glass from between the belts 2, 2.

What I claim is:

1. The combination with a vertical sheet glass drawing machine, of a counterbalanced clamping device above the machine adapted to engage the upper edge of the sheet cut from the continuous sheet being drawn and move upwardly therewith and give it support during and after the cutting off operation, a driven carrier extending laterally from a position at one side of the machine, and a transfer frame pivoted beneath the end of the carrier adjacent the machine having a face for engaging the flat side of the glass sheet and laterally projecting supporting means at one end of such face for engaging the lower edge of the sheet.

2. The combination with a vertical sheet glass drawing machine, of a counterbalanced clamping device above the machine adapted to engage the upper edge of the sheet cut from the continuous sheet being drawn and move upwardly therewith and give it support during and after the cutting off operation, a driven carrier extending laterally from a position at one side of the machine, and a transfer frame pivoted beneath the end of the carrier adjacent the machine having a face for engaging the flat side of the glass sheet and laterally projecting supporting means at one end of such face for engaging the lower edge of the sheet, the said carrier and frame being made in spaced interfitting sections.

3. The combination with a vertical sheet glass drawing machine, of a counterbalanced clamping device above the machine adapted to engage the upper edge of the sheet cut from the continuous sheet being drawn and move upwardly therewith and give it support during and after the cutting off operation, a driven carrier extending laterally from a position at one side of the machine, and a transfer frame pivoted beneath the end of the carrier adjacent the machine having a plurality of similar faces arranged around the axis of the frame for engaging the flat sides of the glass sheets which are cut from said continuous sheet, and supporting means projecting laterally from one edge of each of said faces for engaging the lower edges of said sheets.

4. The combination with a vertical sheet glass drawing machine, of a conuterbalanced clamping device above the machine adapted to engage the upper edge of the sheet cut from the continuous sheet being drawn and move upwardly therewith and give it support during and after the cutting off operation, a driven carrier extending laterally from a position at one side of the machine, and a transfer frame pivoted beneath the end of the carrier adjacent the machine having a plurality of similar faces arranged around the axis of the frame for engaging the flat sides of the glass sheets which are cut from said continuous sheet, supporting means projecting laterally from one edge of each of said faces for engaging the lower edges of said sheets, the said carrier and frame being made in spaced interfitting sections.

5. The combination with a vertical sheet glass drawing machine, of a counterbalanced clamping device above the machine adapted to engage the upper edge of the sheet cut from the continuous sheet being drawn and move upwardly therewith and give it support during and after the cutting off operation, a driven carrier extending laterally from a position at one side of the machine, and a transfer frame pivoted beneath the end of the carrier adjacent the machine having a plurality of similar faces arranged around the axis of the frame for engaging the flat sides of the glass sheets which are cut from said continuous sheet, supporting means projecting laterally from one edge of each of said faces for engaging the lower edge of said sheets, and means for rotating the frame so that the sheets placed thereon are raised and carried over the carrier and lowered thereon.

6. The combination with a vertical sheet glass drawing machine, of a counterbalanced clamping device above the machine adapted to engage the upper edge of the sheet cut from the continuous sheet being drawn and move upwardly therewith and give it support during and after the cutting off operation, a driven carrier extending laterally from a position at one side of the machine, and a transfer frame pivoted beneath the end of the carrier adjacent the machine having a plurality of similar faces arranged around the axis of the frame for engaging the flat sides of the glass sheets which are cut from said continuous sheet, supporting means projecting laterally from one edge of each of said faces for engaging the lower edge of said sheets, and indexing means for the frame for maintaining it in successive positions of rotation with the face in position to receive the next sheet of glass from the clamp inclined somewhat away from a vertical plane.

7. The combination with a vertical sheet glass drawing machine, of a counterbalanced clamping device above the machine adapted to engage the upper edge of the sheet cut from the continuous sheet being drawn and move upwardly therewith and give it support during and after the cutting off operation, a driven carrier extending laterally from a position at one side of the machine, a transfer frame pivoted beneath the end of the carrier adjacent the machine having a face for engaging the flat side of the glass sheet and laterally projecting means at one end of such face for engaging the lower edge of the sheet and indexing means for the frame for maintaining it in receiving position with said face inclined somewhat away from the vertical.

In testimony whereof, I have hereunto subscribed my name this 12th day of Feb., 1924.

WILLIAM OWEN.